United States Patent [19]

Yeager

[11] 4,261,593
[45] Apr. 14, 1981

[54] PLANTING AND FERTILIZING APPARATUS

[75] Inventor: Robert R. Yeager, Union City, Ohio

[73] Assignee: Lambert Corporation, Dayton, Ohio

[21] Appl. No.: 105,827

[22] Filed: Dec. 20, 1979

Related U.S. Application Data

[62] Division of Ser. No. 942,066, Sep. 13, 1978, which is a division of Ser. No. 714,282, Aug. 13, 1976, Pat. No. 4,131,221.

[51] Int. Cl.³ .............................................. B60D 1/02
[52] U.S. Cl. ................................ 280/415 R; 280/400; 280/474; 248/300; 403/262
[58] Field of Search ............... 280/400, 415 R, 415 A, 280/415 B, 417, 474, 495, 500, 502; 248/300, 165, 150; 403/262, 187; 272/748, 763, 646, 657, 753

[56] References Cited

U.S. PATENT DOCUMENTS

| 491,091 | 2/1893 | Drake | 248/300 X |
|---|---|---|---|
| 1,006,268 | 10/1911 | Pierce | 248/300 X |
| 2,486,161 | 10/1949 | Hughes | 280/502 |
| 2,669,405 | 2/1954 | Donnelly | 248/300 X |

Primary Examiner—John J. Love
Assistant Examiner—Randall A. Schrecengost
Attorney, Agent, or Firm—Biebel, French & Nauman

[57] ABSTRACT

A relatively compact and lightweight planting and fertilizing apparatus is attached to a small garden tractor by a universal hitch which restricts lateral movement between the two. The apparatus is spring biased downwardly to assure film contact with the ground, and can be raised above the ground by a single lever. The lever carries the biasing spring, and cams lifting bearings on the lever against a lifting plate on the apparatus. The fertilizer is fed by an axially adjustable feed gear rotated by a ground engaging wheel on the apparatus. The feed gear is biased by an adjusting spring against a threaded adjusting knob which sets the axial position of the feed gear.

3 Claims, 12 Drawing Figures

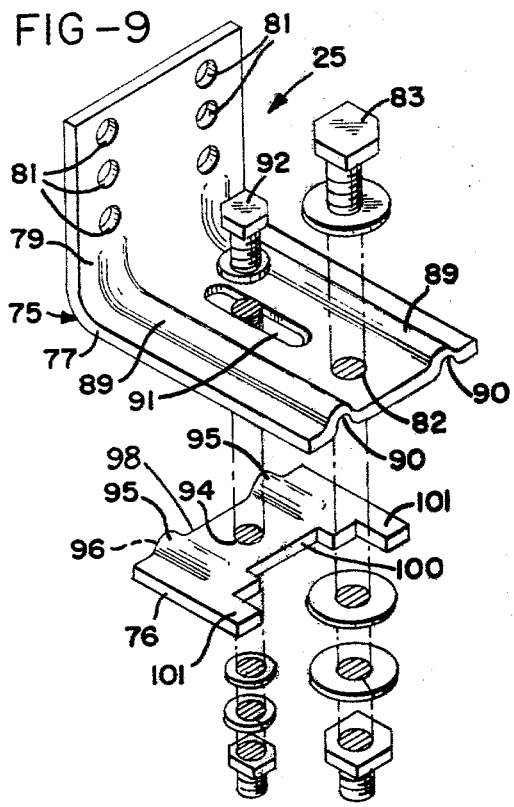
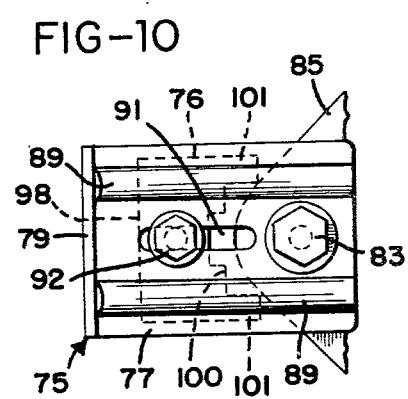
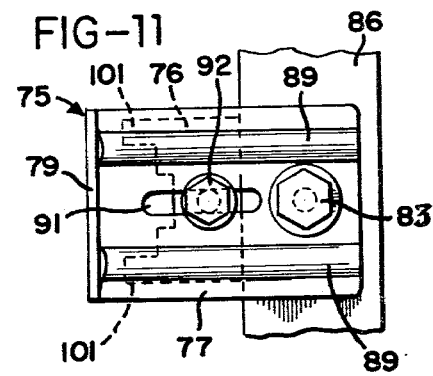
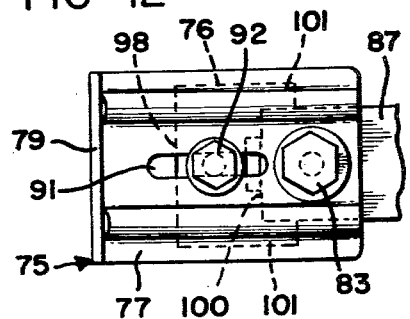

PLANTING AND FERTILIZING APPARATUS

This is a division of application Ser. No. 942,066, filed Sept. 13, 1978, which is a division of application Ser. No. 714,282, filed Aug. 13, 1976 and now U.S. Pat. No. 4,131,221.

BACKGROUND OF THE INVENTION

This invention relates to gardening, and more particularly to an apparatus for use with low power (7–18 hp) garden tractors for planting and fertilizing small gardens, such as home vegetable gardens.

Although modern, large scale farming has long employed highly sophisticated machinery, much of this equipment is not readily adaptable to use on a small scale. A limited number of implements are known and available for small gardens, some hand powered and some designed for use with small power units, such as modest sized garden tractors. Unfortunately, many of these represent little more than awkward adaptations from larger sized commercial machinery, and are inappropriate at worst, and awkward and inconvenient at best.

Thus, there is little standardization and only nominal interchangeability among many small garden components. Even the trailer hitches on small garden tractors, for example, show considerable differences. Wheel Horse uses a baring hitch; Massey Ferguson an elliptical plate; Ford a cross bar hitch.

As another example, fertilizer spreaders for small gardens should be rapidly and easily adjustable, so that the rate of application can be easily and frequently changed, as desired. This is important since only small areas are planted in a given crop, so only small areas will be fertilized at particular rates of application. Full or commercial size fertilizing attachments need to be adjusted only infrequently, and therefore usually lack provisions for quick and easy readjustments.

As still another example, in a home vegetable garden the rows are relatively short, so the fertilizing apparatus must be lifted frequently, as the tractor is turned, to interrupt feeding of the fertilizer. Full size garden tractors, of course, have hydraulic lifts for raising the fertilizer spreader, but these are lacking in low power garden tractors. Further, once lifted, the implement must be restrained against swinging out of position, to one side or the other. This is not always easy to do when tractor hitches show such variation.

As a result, small garden implements which have been adapted from large size commercial machinery frequently lack provisions for easy raising and lowering, for easy and frequent adjustment of the fertilizer feed rate, for attaching them to small tractors regardless of the hitch type, and for controlling their positions once they have been raised.

SUMMARY OF THE INVENTION

Briefly, the present invention provides a manually operable lift mechanism for lifting and lowering a relatively small gardening apparatus, a hitch for attaching it to a small garden tractor (on the order of 7–18 hp), and a feeder for feeding fertilizer at easily controlled and adjustable rates. The lift mechanism is operated by a single handle which, when pulled, cams a pair of bearings against a curved lift plate. This forces the gardening apparatus to rotate upwardly about the pivot on which it is supported, thus lifting it off the ground. When in the fully raised position, the bearings on the handle move beneath a lip on the plate to lock the apparatus in the up or raised position. When raised, the lip describes a surface, the points of which are substantially radially equidistant from the handle pivot, so that the forces on the handle are directed only radially toward the pivot. The handle therefore has no tendency to move out of position.

When the handle is moved to the full down position, a spring which is carried on the handle and which presses downwardly on the lift plate is moved onto a flat on the lift plate to lock the handle in the down position and to provide a downward bias on the gardening apparatus. When down, the flat also describes a radially equidistant surface about the handle pivot, and the downward pressure of the spring on the lift plate assures that the gardening apparatus will be maintained in firm contact with the ground. This is important since relatively small gardening devies often weigh very little and their ground engaging wheels might not otherwise engage the ground with sufficient force to shape the ground (when the wheel is designed to do this) and/or drive the operative elements of the gardening apparatus.

The easily and quickly adjustable fertilizer feed mechanism of the present invention includes an axially displaceable feed gear located generally in the feed chute leading from the bottom of the fertilizer hopper. The feed gear is rotated by the ground engaging wheel of the gardening apparatus, and as the gear teeth thereon rotate, they pick up and carry measured amounts of fertilizer to release it through the feed chute in synchronism with rotation of the ground engaging wheel.

When the feed rate is to be changed, a threaded adjusting knob on a threaded end of the feed gear drive shaft is turned thereon to shift the knob inwardly or outwardly along the drive shaft. An adjusting spring on the side of the feed gear opposite the adjusting knob biases the feed gear against the adjusting knob so that the feed gear is shifted along the drive shaft with the adjusting knob. This moves the feed gear rapidly and quickly in a lateral direction with respect to the openings to and from the fertilizer feed chute, exposing greater or smaller portions of the gear teeth to the fertilizer coming from the fertilizer hopper. This, in turn, increases or decreases, respectively, the rate at which the fertilizer is fed. This form of adjustment is much more convenient and much more rapid than prior devices, and is therefore much better suited for use in small size gardens.

The universal hitch of the present invention attaches small gardening implements to most of the hitches commonly found on small garden tractors, and restricts lateral movement of the gardening implements relative to the tractor. The universal hitch provides a hitch arm and an adjustable hitch lock which are locked against rotation with respect to each other by interengaging grooves and ribs. The hitch arm is attached in the customary manner to the hitch on the tractor, and the opposite end of the hitch arm is attached to the gardening implement. The ribs and grooves extend longitudinally between the implement and the tractor hitch, and the hitch lock is brought into firm engagement with the tracor hitch, and tightened and locked in position thereagainst. The hitch lock has a flat edge along one side and a stepped opening with extended fingers on the opposite side. If the hitch is a cross bar hitch, the flat edge of the hitch lock is locked against the tractor hitch. If the tractor uses a bar hitch, the hitch lock is reversed and moved against the bar hitch to place the bar thereof within the steps of the hitch lock, with the hitch lock fingers engaging the sides of the bar hitch. If the tractor hitch is an elliptical plate, the hitch lock is similarly disposed as with the bar hitch, with the fingers of the hitch lock being brought up against the sides of the elliptical plate. Regardless of the type of tractor hitch, therefore, after the hitch lock is tightened in position, lateral movement of the gardening implement with respect to the tractor is restricted.

It is therefore an object of the present invention to provide an improved planting and fertilizing apparatus; an apparatus which can be easily and quickly raised or lowered by a manually operable handle when attached to and drawn by a garden tractor; which includes a fertilizer feed mechanism which can be easily and quickly adjusted to vary the rate of fertilizer feed; which incorporates a universal hitch to restrict lateral movement of the apparatus with respect to the tractor to which it is attached, regardless of the type of hitch on the tractor; and to accomplish the above objects and purposes in an uncomplicated, inexpensive, durable and reliable apparatus readily suited to wide utilization with small scale gardening apparatus.

Other objects and advantages of the invention will be apparent from the following description, the accompanying drawings and the appended claims.

BRIEF DESCRIPTION OF THE DRAWINGS

FIG. 9 is an exploded view of the universal hitch of the present invention;

FIG. 10 is a plan view of the universal hitch attached to an elliptical plate tractor hitch;

FIG. 11 is a plan view of the universal hitch attached to a cross bar tractor hitch; and FIG. 12 is a plan view of the universal hitch attached to a bar tractor hitch.

DESCRIPTION OF THE PREFERRED EMBODIMENT

Figure 1:
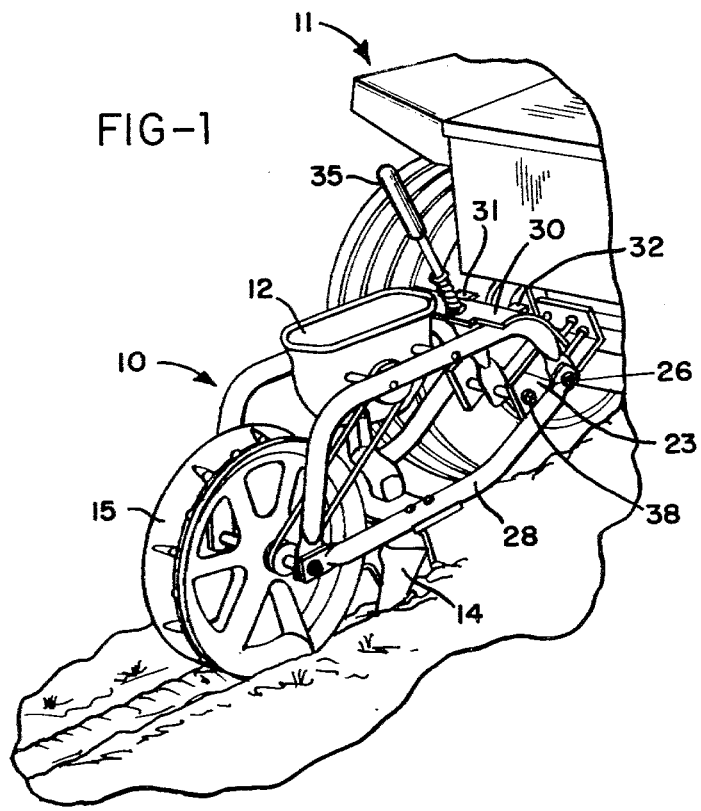
FIG. 1 is a perspective fragmentary view of a gardening apparatus incorporating the features of the present invention.

The planting and fertilizing apparatus 10 illustrated in FIG. 1 is designed to be drawn by a conventional small garden tractor 11. Apparatus 10, as illustrated, is equipped with a fertilizer hopper 12 for dispensing a metered amount of fertilizer in a furrow prepared by a plow 14 as the tractor 11 pulls the apparatus 10 along the ground. The apparatus 10 is supported at one end by the tractor 11, and supported at the other by a wheel 15 which is attached thereto and engages the ground to shape the soil after the fertilizer has been dispensed. Wheel 15 also drives a belt 16 which drives a pulley 18 to operate a fertilizer feeding mechanism 20 mounted at the bottom of the fertilizer hopper 12 in the fertilizer feed chute 21. Chute 21 extends downwardly from the hopper 12 and feeding mechanism 20 to the plow 14 for delivering fertilizer 22 from the hopper into the furrow prepared by the plow.

Small scale gardening devices such as the planting and fertilizing apparatus 10 may not have sufficient weight to keep wheel 15 in firm contact with the ground, particularly since components such as wheel 15 and hopper 12 are often made of lightweight plastic material. Without sufficient pressure, the inwardly curved surface of the wheel will not shape the ground as it rolls thereover, and may slide rather than rotate, failing to drive the belt 16. On the other hand, provision must be made for lifting the wheel 15 out of contact with the ground, as desired, such as at the ends of the rows being treated.

The present invention therefore includes a lifting mechanism which provides a resilient downward bias on the apparatus 10 when in the down position, and lifts it out of contact with the ground when moved to the up position. The lifting apparatus includes a frame bracket 23 which may be attached directly to the hitch on the tractor 11, or indirectly thereto by means of an adapter such as the universal hitch 25. Either way, the frame bracket 23 is supported rigidly with respect to vertical movement relative to the tractor 11. A first or frame pivot 26 attaches the frame 28 of apparatus 10 to frame bracket 23 for pivoting it upwardly and around the frame bracket on a substantially horizontal axis of rotation. The frame 28 is rigid, and supports a curved lift plate 30 thereon along a path extending toward and away from the frame pivot 26. Lift plate 30 has a slot 31 therethrough, a plate lip 32 at the end of the slot nearest the frame pivot 26, and a flat 33 on the end of the slot farthest from the frame pivot 26, that is, on the end of the lift plate opposite the plate lip 32.

Figure 2:
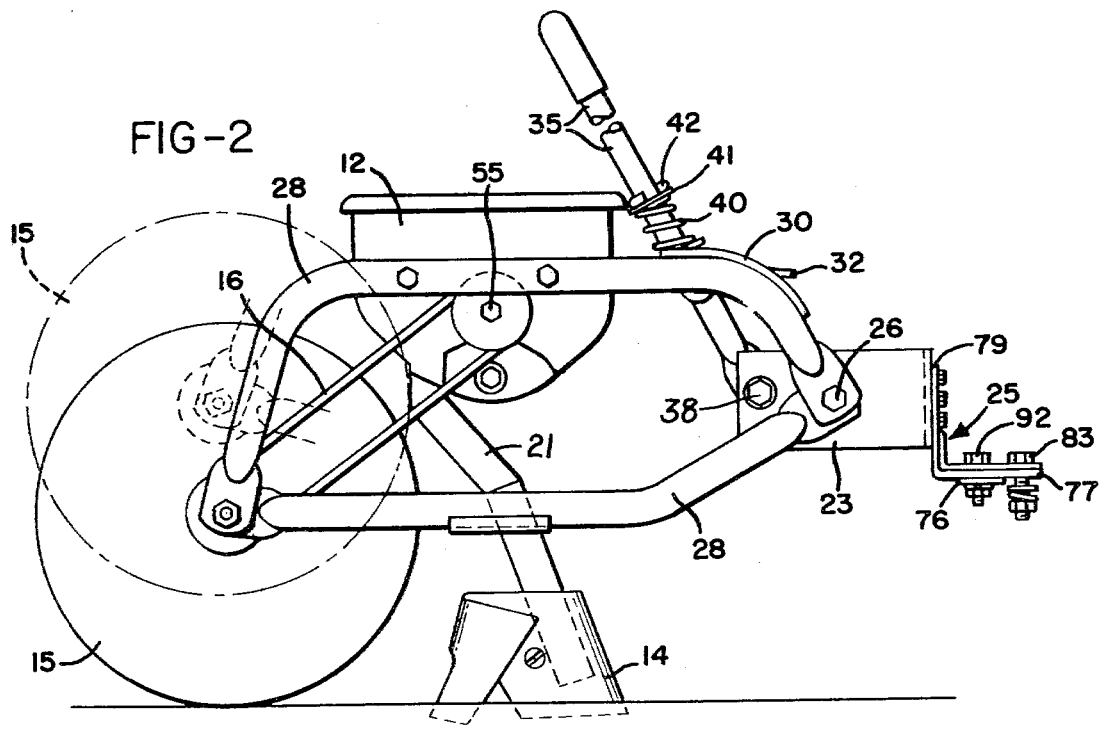
FIG. 2 is a somewhat diagrammatic side view of the FIG. 1 apparatus shown in the down position, with the up position of the wheel illustrated in phantom.
Figure 3:
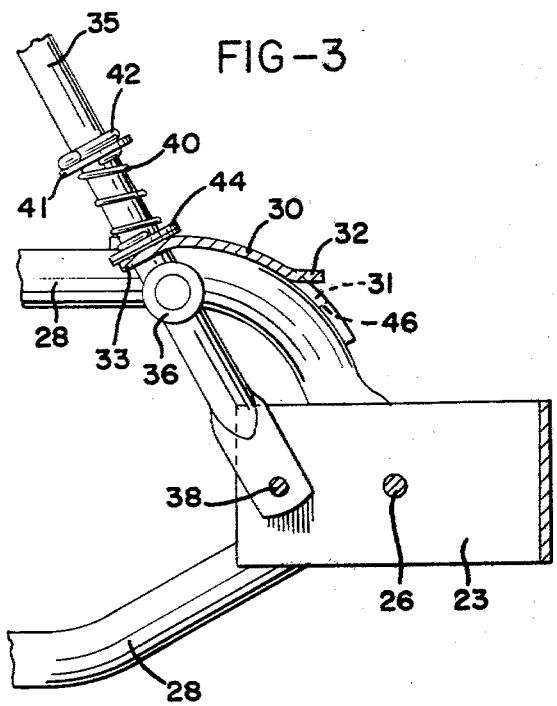
FIG. 3 is a fragmentary side view, partially in section, of the lifting mechanism of the apparatus, shown in the down or ground engaging position.
Figure 4:
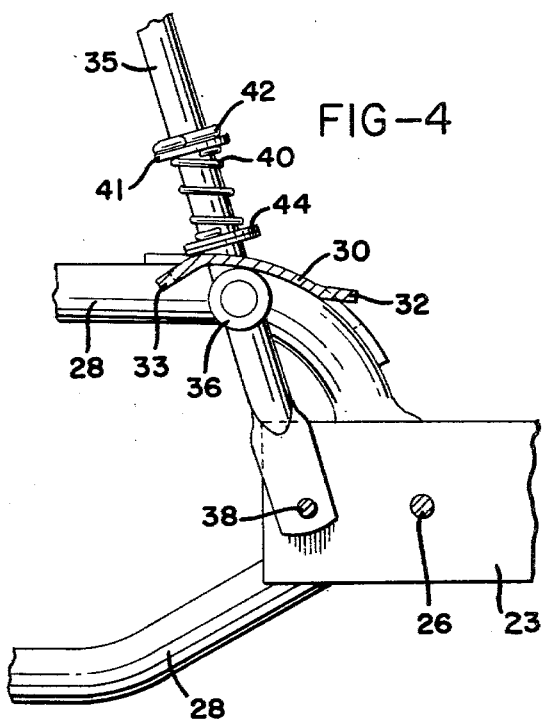
FIG. 4 is a view similar to FIG. 3, showing commencement of the lifting operation.
Figure 5:
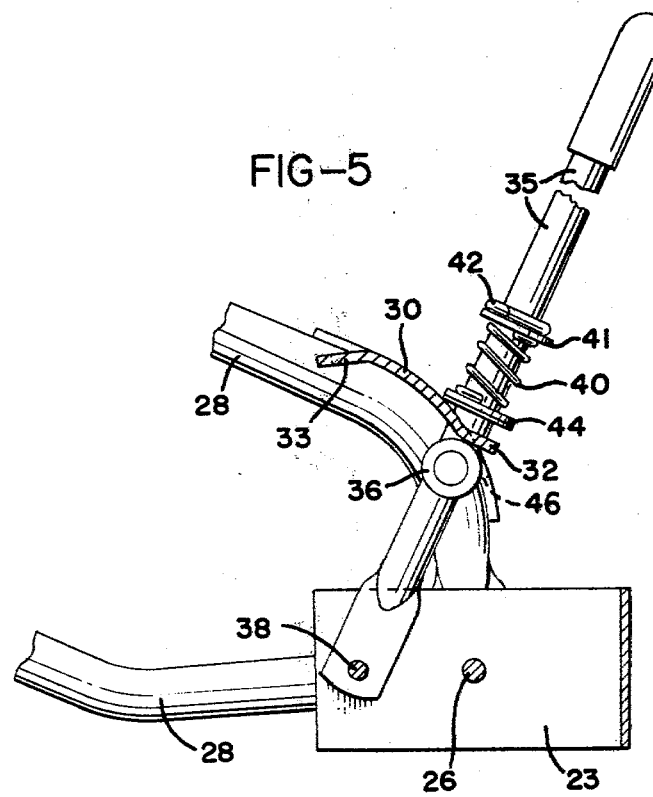
FIG. 5 is a view similar to FIGS. 3 and 4, showing the mechanism in the fully raised position.

The apparatus 10 is raised and lowered about the frame pivot 26 by a lifting handle 35 which moves through slot 31 and carries a pair of bearings 36 on either side of the slot which cam against the lift plate 30 to raise and lower the apparatus 10 as the handle 35 is rotated about a handle pivot 38 to the frame bracket 23 for rotation on an axis of rotation displaced from and substantially parallel to the axis of rotation defined by the frame pivot 26. FIGS. 2 and 3 illustrate the apparatus in the ground engaging or "down" position; FIG. 4 illustrates the lifting handle 35 partially rotated about its pivot 38 toward the raised or "up" position; and FIG. 5 illustrates the apparatus in the fully raised or up position, the corresponding up position of wheel 15 being shown in phantom in FIG. 2.

A spring 40 is wrapped about handle 35 and held thereon at its upper end by a washer 41 secured by a cotter pin 42. The lower end of the spring bears against a second washer 44 which engages the top side of the lift plate 30. The washer 41 and cotter pin 42 maintain the spring 40 in downward compression against the second washer 44, which in turn presses downwardly on the lift plate 30 to bias the apparatus 10 downwardly when in the down position, as illustrated in FIGS. 2 and 3.

The plate lip 32 describes a surface about handle pivot 38, the various parts of which are substantially radially equidistant therefrom when the handle 35 is positioned thereadjacent. Flat 33 likewise describes a surface about handle pivot 38 whose parts are substantially radially equidistant therefrom when the handle 35 is positioned thereadjacent. Thus, when the handle and apparatus 10 are in the down position (FIGS. 2 and 3), the washer 44 presses against flat 33 in a radial direction with respect to lifting handle 35 and its pivot 38. This presses or biases the apparatus 10 downwardly without generating forces which might rotate handle 35 out of position.

Similarly, when the bearings 36 reach the plate lip 32 in the up position (FIG. 5), the lip presses only radially on the handle 35, through its pivot 38, so that the handle 35 and the apparatus 10 remain engaged in the up position. In practice, the plate lip 32 may be raised slightly further, although still substantially radially equidistant from the handle pivot 38, to generate a light force on bearings 36 and handle 35 in a clockwise rotational sense (as seen in FIG. 5). Such an overcenter condition will help lock the handle 35 and apparatus 10 in the up position by urging the handle 35 against the forward end 46 of the slot 31.

Figure 6:
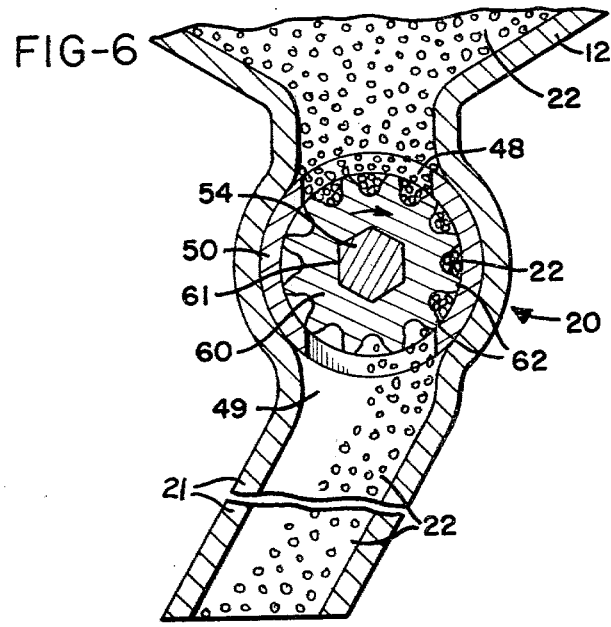
FIG. 6 is a fragmentary cross-sectional view of the fertilizer feeding mechanism, taken generally on line 6—6 of FIG. 7.
Figure 7:
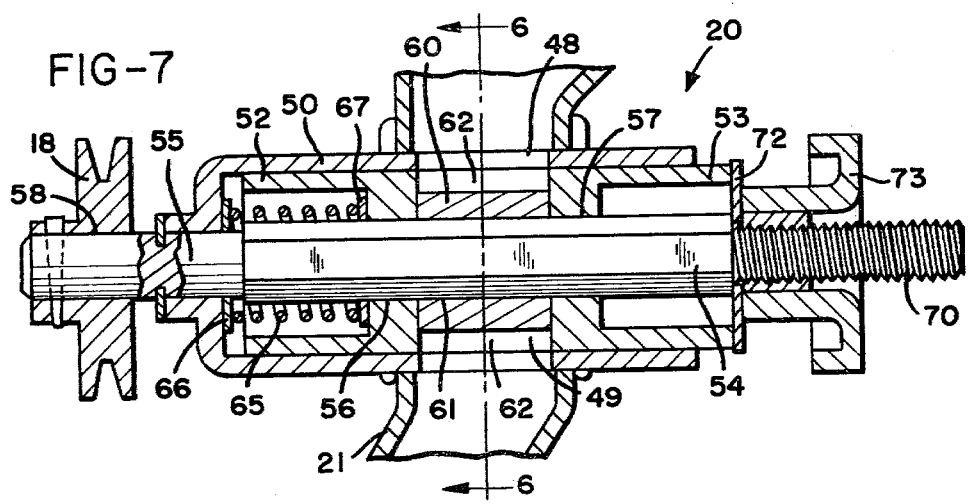
FIG. 7 is a cross-sectional view of the fertilizer feeding mechanism in the full feeding rate position.
Figure 8:
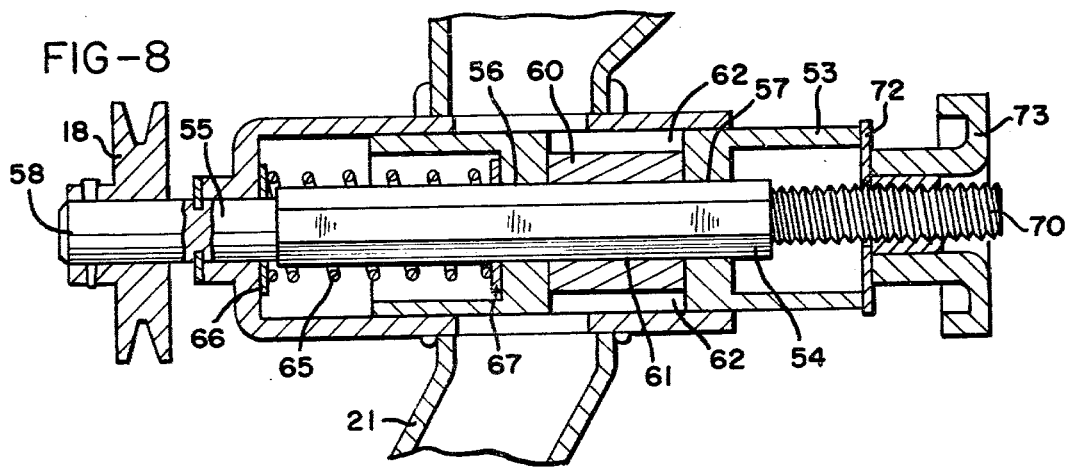
FIG. 8 is a view similar to FIG. 7 with the mechanism adjusted to a minimum feed position.

FIGS. 6-8 illustrate details of the fertilizer feeding mechanism 20 which may be located at the bottom of the hopper 12 on the top of the fertilizer feed chute 21 or at any convenient location in the fertilizer feed chute. Wherever located, the fertilizer feeding mechanism 20 is provided with an upwardly facing entry opening 48 and an oppositely disposed exit opening 49 for receiving and releasing the fertilizer as it is metered by mechanism 20. Entry and exit openings 48 and 49 are therefore in, and intercept, the flow path of the fertilizer 22 through the interior of the fertilizer feed chute 21.

In the preferred embodiment, openings 48 and 49 are provided in opposite sides of a bearing tube 50 (FIGS. 6-8) which slidably supports first and second feed gear extensions 52 and 53 within each end thereof. Extensions 52 and 53 are free to move axially within bearing tube 50. However, the extensions are also fixed to rotate therein on the hexagonally shaped portion 54 of a drive shaft 55 which is supported in the center of the bearing tube 50 by the extensions 52 and 53. The drive shaft is received in the extensions and drives the extensions through complementary hexagonally shaped extension openings 56 and 57. One end 58 of shaft 55 extends through the adjacent end of bearing tube 50 and has the pulley 18 mounted thereon for rotating shaft 55 in response to rotation of wheel 15.

Mounted centrally on shaft 55 is a feed gear 60 having a central hexagonally shaped opening 61 for receiving portion 54 of shaft 55 therethrough. Feed gear 60 is located on shaft 55 between the first and second feed gear extensions 52 and 53, and the extensions and feed gear rotate in unison with shaft 55 due to the hexagonal shape of portion 54 and the complementary openings 56, 57, and 61.

As illustrated in FIG. 6, feed gear 60 includes gear teeth 62 which rotate past the entry opening 48 and around to the exit opening 49, carrying the fertilizer 22 around the bearing tube 50 in proportion to the rate of rotation of wheel 15, and hence pulley 18, drive shaft 55, and feed gear 60.

FIGS. 7 and 8 illustrate the means by which the overall rate of fertilizer feed may be adjusted. An adjusting spring 65 is mounted within the first feed gear extension 52 between washers 66 and 67 at each end of the spring 65. These are mounted on the side of shaft 55 near its end 58, so that washer 66 is pressed against the end of bearing tube 50 thereadjacent. The spring 65 is in compression, so washer 67 drives the first feed gear extension 52 in the opposite direction toward the threaded end 70 of drive shaft 55, opposite the shaft end 58. In turn, the first feed gear extension 52 presses the feed gear 60 in the same direction, and it presses the second feed gear extension 53 the same way. These are held against spring 65 by a washer 72 and an adjusting knob 73 which is screwed or threaded onto the threaded end 70 of drive shaft 55. Thus, as adjusting knob 73 is screwed onto shaft end 70, it shifts the first and second feed gear extensions 52 and 53 and the feed gear 60 toward the left as viewed in FIGS. 7 and 8, and vice versa.

When moved to approximately the full left position, as shown in FIG. 7, the entire feed gear 60 is placed opposite the entry and exit openings 48 and 49, so that the gear teeth 62 are fully loaded with the fertilizer 22 for a maximum delivery rate. When knob 73 is screwed outwardly, as illustrated in FIG. 8, the feed gear is shifted to the right and away from the openings 48 and 49, so that only small portions of the feed gear teeth 62 are exposed, as desired by the operator, for reducing the rate of feed accordingly. By this means, the exact position of the feed gear 60 with respect to the entry and exit openings 48 and 49 may be quickly, easily, and accurately adjusted. This substantially increases the convenience and utility of this mechanism for fertilizing relatively small gardens, where frequent changes in the rate of feed are desired as the apparatus 10 is moved from one crop to another.

FIGS. 9-12 illustrate details of the universal hitch 25 of the present invention. The hitch consists basically of two parts, an L-shaped hitch arm 75 and a substantially flat hitch lock plate 76. Arm 75 has a horizontal portion 77 extending away from a vertically disposed portion 79. Portion 79 is provided with holes 81 which may be used selectively for attaching arm 75 to a gardening apparatus at any of several heights. The end of the horizontal portion 77 opposite the vertical portion 79 has a hitch hole 82 for receiving a bolt 83 for hitching portion 77 to the hitch on the tractor. FIGS. 10-12 illustrates three such tractor hitches 85-87. Hitch 85 is an elliptical plate hitch; hitch 86 is a cross bar hitch; hitch 87 is a straight bar hitch.

The horizontal portion 77 of hitch arm 75 has a pair of ribs 89 on one side thereof and complementary grooves 90 on the opposite side. A slot 91 is disposed between the ribs for receiving a locking bolt 92. Bolt 92 also passes through an opening 94 in hitch lock 76 for tightening hitch lock 76 against hitch arm 75 for locking it in position thereon. Hitch lock 76 also has rib 75 and grooves 96 which are complementary to and disposed opposite the corresponding ribs and grooves 89 and 90 on the hitch arm 75. As illustrated in FIG. 9, therefore, when the hitch lock 76 is moved in position beneath the horizontal portion 77 of hitch arm 75, the ribs 95 on the hitch lock 76 are received in the grooves 90 of the hitch arm 75. The ribs 95 can then be slid along in the grooves 90, bolt 92 similarly sliding in slot 91 to adjust the position of the hitch lock 76 on the hitch arm 75. In practice, as illustrated in FIGS. 10-12, the hitch lock is slid toward the hitch 85, 86, or 87, until firmly engaged therewith, and the lock 76 is then tightened in position by bolt 92.

Hitch lock 76 has a flat edge 98 on one side and a stepped opening 100 on the opposite side. Opening 100 is defined by outwardly extending fingers 101 at the sides thereof. Thus, as illustrated in FIG. 10, the elliptical hitch 85 is engaged by the fingers 101. FIG. 12 shows the bar hitch 87 engaged within the stepped opening 100. FIG. 11 illustrates that a cross bar hitch 86 is engaged by reversing the hitch lock 76 to place its flat edge 98 against the cross bar hitch 86. When thus positioned, the ribs 95 are engaged within the grooves 90 to prevent the hitch lock 76 from rotating with respect to the hitch arm 75. This prevents the universal hitch 25 from rotating with respect to the tractor hitches 85-87, since the latter are firmly engaged by the hitch lock 76, as illustrated.

Of course, the hitch arm 75 may be inverted to accommodate other vertical positions of the gardening apparatus 10. Likewise, the hitch lock 76 may be placed on the other side of the horizontal portion 77 of the hitch arm 75, the grooves 96 in the hitch lock 76 then receiving the ribs 89 on the hitch arm 75 to prevent rotation therebetween.

As may be seen, therefore, the present invention provides numerous advantages. The gardening implement, such as the planting and fertilizing apparatus 10, may be quickly and easily raised and lowered by a simple movement of the lifting handle 35. When raised, the lifting mechanism is securely held in the up position. When lowered, the apparatus is pressed downwardly into firm engagement with the ground by the spring 40. Wheel 15 thus firmly engages the ground for shaping it and driving belt 16, so that a variety of powered devices, such as seeders (not illustrated) or fertilizer feeders (such as mechanism 20) may be synchronously driven with movement of the apparatus across the ground. The fertilizer feeding mechanism 20 itself is quickly, easily, and accurately adjustable to provide accurate and precise feeding of fertilizer and to permit frequent adjustment as the user advances from one crop to another in a small garden. Finally, the universal hitch 25 permits a wide variety of gardening implements to be drawn by many different small garden tractors, regardless of the type of hitch on the tractor, so that the gardening implement can be restricted against lateral movement with respect to the tractor. The restriction against lateral movement is provided by the hitch lock 76 which engages the tractor hitch at at least two laterally displaced points thereon to lock the universal hitch 25 in position on the tractor hitch.

While the forms of apparatus herein described constitute preferred embodiments of this invention, it is to be understood that the invention is not limited to these precise forms of apparatus, and that changes may be made therein without departing from the scope of the invention.

What is claimed is:

1. For use with a gardening apparatus, a universal hitch for attaching the gardening apparatus to a garden tractor hitch for supporting the apparatus and restricting lateral movement thereof relative to the tractor, comprising:
   (a) a hitch arm having a substantially horizontal portion,
   (b) a hitch lock for engaging the tractor hitch simultaneously at at least two laterally displaced points thereon for restricting lateral movement with respect thereto,
   (c) said hitch lock having a substantially flat surface on one end thereof,
   (d) means forming a stepped opening on the end of said hitch lock opposite said one end thereof, the sides of said stepped opening defining a pair of oppositely disposed outwardly extending fingers, and
   (e) means for locking said hitch lock on said hitch arm portion in engagement with and positioned against the tractor hitch at said at least two laterally displaced points for restricting lateral movement with respect to said universal hitch regardless of the configuration of the tractor hitch.

2. The hitch of claim 1 further comprising:
   (a) means forming at least one groove extending along said hitch arm portion on one of the top or bottom sides thereof,
   (b) means forming a complementary rib on the opposite side of said hitch arm portion for each said groove,
   (c) means forming ribs in said hitch lock complementary to said groove in said hitch arm portion and receivable therein when placed thereadjacent,
   (d) means forming complementary grooves in said hitch lock on the opposite side from the ribs therein, said hitch lock on the opposite side from the ribs therein, said hitch lock grooves also being complementary to said ribs on said hitch arm portion for receiving said ribs therein when placed thereadjacent, said ribs and grooves preventing relative rotation between said hitch lock and said hitch arm when interengaged, and
   (e) means for locking said hitch lock on said hitch arm portion with the ribs and grooves thereof interengaged.

3. The hitch of claim 2 wherein said means for locking said hitch lock on said hitch arm portion includes means for adjusting the position of said hitch lock on said hitch arm portion by releasing said locking means, sliding said ribs along said grooves, and then again locking said hitch lock in position on said hitch arm.

* * * * *